March 2, 1937.  D. G. SMELLIE  2,072,689
SUCTION CLEANER
Filed May 5, 1933  5 Sheets-Sheet 1

INVENTOR
Donald G. Smellie
BY
Harry S. Dumarse
ATTORNEY

March 2, 1937.    D. G. SMELLIE    2,072,689
SUCTION CLEANER
Filed May 5, 1933    5 Sheets-Sheet 3

INVENTOR
Donald G. Smellie
BY
Harry L. Demarse
ATTORNEY

March 2, 1937.  D. G. SMELLIE  2,072,689
SUCTION CLEANER
Filed May 5, 1933  5 Sheets-Sheet 4

INVENTOR
Donald G. Smellie
BY
Harry J. Druerss
ATTORNEY

March 2, 1937.  D. G. SMELLIE  2,072,689
SUCTION CLEANER
Filed May 5, 1933  5 Sheets-Sheet 5

INVENTOR
Donald G. Smellie
BY
Harry T. Dumars
ATTORNEY

Patented Mar. 2, 1937

2,072,689

UNITED STATES PATENT OFFICE 2,072,689

SUCTION CLEANER

Donald G. Smellie, Canton, Ohio, assignor to The Hoover Company, North Canton, Ohio, a corporation of Ohio Application May 5, 1933, Serial No. 669,480

22 Claims. (Cl. 15—13)

The present invention relates to suction cleaners generally, and more specifically to a dusting tool for use in connection with a suction cleaner. Still more particularly the invention comprises the provision of a floor-cleaning-type suction cleaner and dusting tools which are so constructed that covering agitation is obtained at the cleaning or nozzle end of the dusting tool hose.

It is an object of the present invention to provide a new and improved combination of dusting tool hose, nozzle, and floor-type suction cleaner. Another object is the provision in a suction cleaning unit of a dusting tool which is provided with covering-agitating means. A further object is a provision of a suction cleaner dusting tool which embodies electrically vibrated agitating means. A still further object is the provision, in a suction cleaner construction, of a movable floor-type suction cleaner, a dusting tool hose which is adapted to be connected to and detached from said cleaner at a point spaced therefrom, together with a surface-contacting nozzle at the opposite end of the dusting tool hose provided with its own agitator-actuating means which means are electrically connected through the dusting tool hose to the cleaner. Still another object is the provision of a dusting tool nozzle having positively actuated lips. These and other more specific objects will appear upon reading the following specification and claims and upon considering in connection therewith the attached drawings to which they relate.

In the drawings in which preferred embodiments of the present invention are disclosed.

The modern suction cleaner comprises a unit which includes a movable casing, preferably supported by wheels, and which houses suction-creating means which function to draw cleaning air through the casing nozzle and exhaust it into a suitable dust receptacle or bag. A handle is pivotally connected to the cleaner casing and provides means by which the operator can propel the machine. Efficient modern cleaners vary in weight, but usually weigh approximately fifteen pounds. Cleaners built of lesser weight involve the sacrifice of metal and materials necessary for efficiency and cleaning effectiveness. This weight makes the cleaner unsuitable for use in the cleaning of drapes, curtains, upholstery, etc. positioned above the floor.

In order to extend the range of usefulness of the modern cleaner dusting tool units have been provided which are adapted to be connected to the suction-creating means of the cleaner. These dusting tool units commonly comprise an elongated flexible hose, directly connected at its cleaner end to the suction-creating means, and at its opposite end to a nozzle adapted to contact the article undergoing cleaning and restrict the flow of cleaning air to that point. The hose and nozzle are relatively light in weight, and by their use drapes, curtains, etc. may be cleaned easily.

The use of dusting tools has, in the past, however, been relatively inefficient because the cleaning effected thereby was dependent solely upon the effectiveness of the cleaning air which enters the dusting tool nozzle. Because of the relatively great distance from the dusting tool nozzle to the machine proper it was unfeasible to convey mechanical force between the two points. In the dusting tool units constructed in accordance with the present invention, means are provided at the dusting tool nozzle which function to agitate positively the upholstery, drapes or other article undergoing cleaning. In the construction of applicant's invention this desirable end has been accomplished in a simple manner, as will be hereinafter fully set forth.

Referring again to the drawings, and to Figures 1 to 12 inclusive in particular, a dusting tool unit, comprising a nozzle 1 and a flexible hose 2, is shown connected to a modern suction cleaner. The suction cleaner is of a common and well-known type, including a motor 4 which functions to drive a suction-creating fan 3 within the fan chamber of the cleaner casing 5 to create a reduced pressure, which, in on-the-floor cleaning, draws cleaning air through the casing nozzle and exhausts it through the cleaner exhaust outlet 6 into the dust bag 7. The cleaner is movably supported by suitable wheels, of which only a front wheel 8 is visible, and there is provided a suitably pivoted handle 9 by which the operator may propel the machine. A detachable converter or conduit 10 leads to the eye of the fan chamber in casing 5 and to the end of this conduit is removably attached the cleaner end of the tool hose 2.

Figures 1, 2, 3, 4:
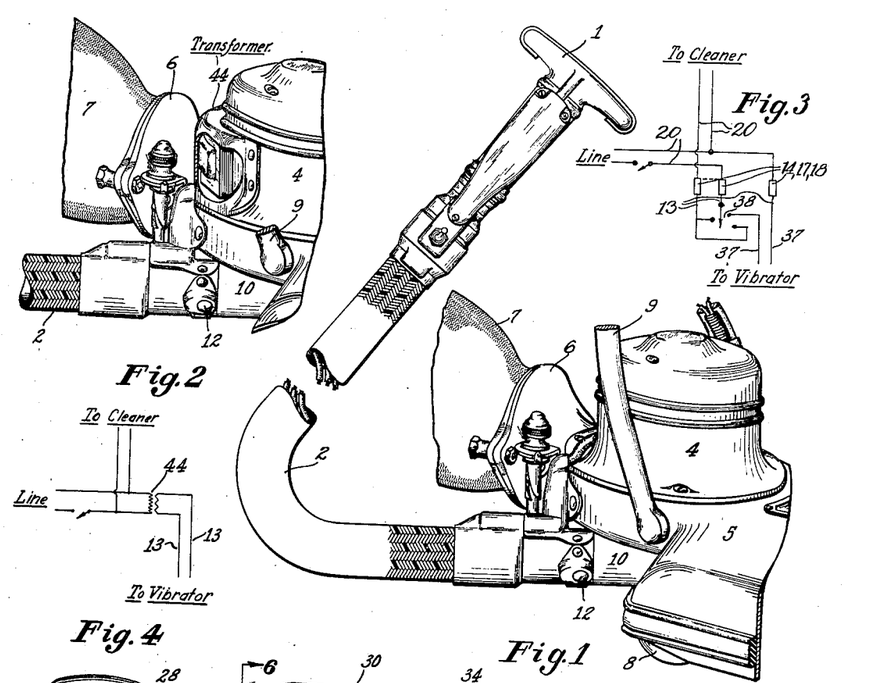
Figure 1 is a partial showing of a modern suction cleaner showing the dusting tool unit connected thereto.
Figure 2 is a partial showing of a slightly modified embodiment.
Figure 3 is a schematic diagram showing the electrical connection between the line, the cleaner proper, and the vibrator on the dusting tool.
Figure 4 is a diagrammatic showing of the embodiment shown in Figure 2 illustrating a transformer in the circuit of the vibrator on the dusting tool nozzle.
Figures 8, 9, 10, 11, 12:
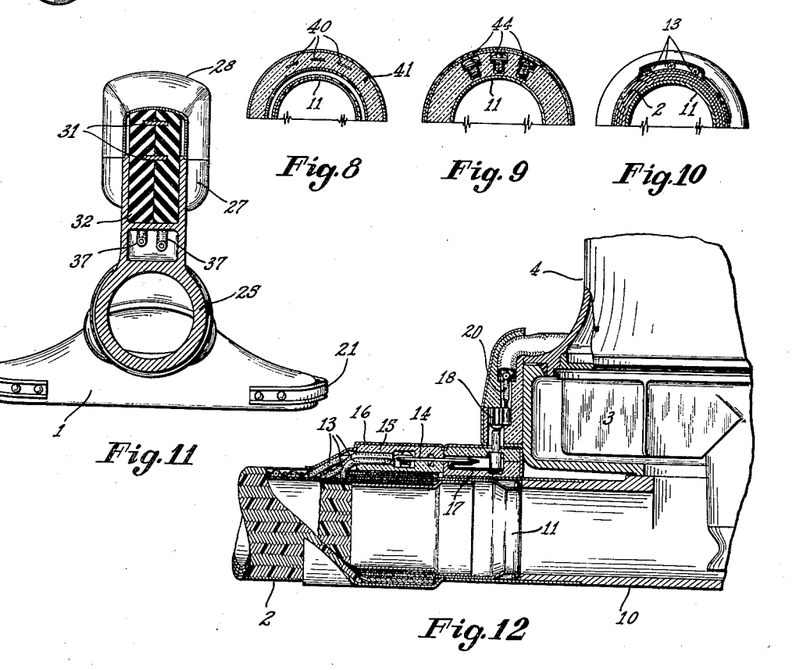
Figure 8 is a section upon the line 8—8 of Figure 5.
Figure 9 is a section upon the line 9—9 of Figure 5.
Figure 10 is a section upon the line 10—10 of Figure 5.
Figure 11 is a section upon the line 11—11 of Figure 5.
Figure 12 is a vertical section showing the connection of the dusting tool hose to the cleaner proper including the connection of the air conduit to the suction-creating means and the electrical conductors to the source of electrical supply.

Referring to Figures 1 and 12 in particular, a clear showing is found of the relationship between the dusting tool hose and the cleaner at their point of connection. The inner end 11 of the hose 2 comprises a metallic member which seats within the conduit 10 being removably secured therein by suitable locking means, such as a spring-pressed detent, indicated generally by the reference character 12. The conduit 2 is alined with the conduit 10 so that cleaning air may be drawn directly through conduit 2, thru inlet 10 and into the fan chamber. Electrical conductors 13, 13, 13, the number depending on the electrical circuit used, extend in the wall of conduit 2 for its entire length emerging therefrom at the cleaner end where each conductor is connected to a suitable contact 14. The contacts 14 are carried in an insulating body 15, there being an enclosing metallic shield or body 16 surrounding the end of the conduit and protecting the contacts. Each contact 14 makes electrical contact with an insulated contact 17 carried by conduit 10 which being L-shaped extends upwardly into contact with a contact 18 carried permanently by the cleaner at the end of a current-carrying conductor 20. It is to be noted that the contacts 17 are detachable from the contacts 14 and 18 and are designed to be connected to the latter upon the positioning of conduit 10 before the dusting tool hose is connected to the cleaner. The disconnecting of the dusting tool hose from the inlet 10 results in the interruption of the electrical circuit to the conductors 13, breaking the contact made by the contacts 14 and 17.

Figures 5, 6:
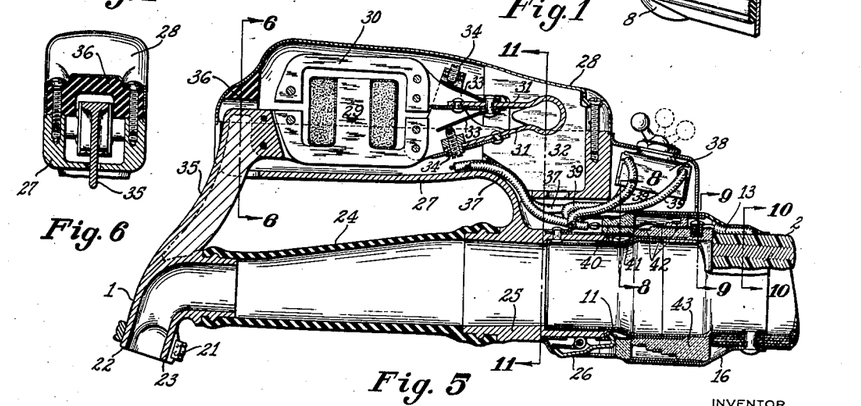
Figure 5 is a vertical section through a dusting tool nozzle unit constructed in accordance with the present invention, showing the electric vibrator connected to the nozzle proper.
Figure 6 is a section upon the line 6—6 of Figure 5.

At the end of the dusting tool hose spaced from the cleaner a unit is removably carried which may be called broadly a vibrating dusting tool nozzle. This unit comprises a plurality of parts including a nozzle proper 1, formed as the surface-contacting mouth for the hose 2. A rubber furniture guard 21 encircles the lower end of nozzle and insures that articles of furniture will not be marred. Nozzle 1 includes lips 22 and 23 which are adapted to contact a surface or article undergoing cleaning in order that the cleaning air entering the nozzle will pass closely adjacent the object being cleaned. Nozzle proper 1 is spaced from the end of the dusting tool hose 2 and is connected thereto by a conduit which comprises a flexible resilient tube 24 and a rigid metallic section 25 at the end thereof which is itself in abutment with the end member 11 of hose 2, being removably secured thereto by means of a manually operable spring-pressed detent 26.

Figure 7:
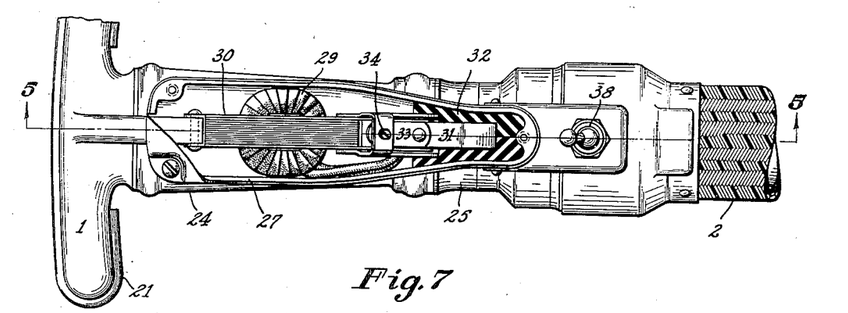
Figure 7 is a top view of the dusting tool with the handle cover portion removed disclosing the vibrator positioned therein.

A hollow metallic handle 27 is rigidly carried by the metallic section 25 and extends forwardly and above the flexible rubber tube 24, being provided with a removable top portion 28. Within the handle is mounted a vibrator comprising a movably mounted relatively heavy field, indicated generally by the reference character 29, and a movably mounted relatively light armature, indicated generally by the reference character 30. Both the field and the armature in the vibrator are movable and are supported by springs 31, 31 which are embedded in a body of rubber 32 carried by the hollow handle. Armature 30 is freely movable, its movement being limited, however, by springs 33, 33 carried by springs 31, 31 which contact stops 34, 34, made adjustable to vary the range of movement. The movable field 29 is rigidly connected by an arm 35 to the nozzle 1 so that its movement will be directly transmitted to the nozzle. The armature, though mounted to vibrate, is connected to no useful load. The forward end of the handle 27 is made with a bottom opening to permit the arm 35 to extend therethrough and to permit the limited movement thereof, there being a second body of rubber 36 positioned immediately above the arm 35 to prevent generation of sound.

Electric leads 37, 37 extend from the field 29, through the hollow handle 27 to a three-position switch 38 positioned at the rear thereof. From the switch 38 each of three leads, indicated by the reference character 39, extends to a contact 40, see Figures 5 and 8. These contacts are mutually insulated, being spaced and embedded in a body of insulation 41 which circles the end of metallic member 25, the contacts 40, 40, 40 extending beyond the end of that member. Ring contacts 42, 42, 42 are carried by an insulating ring 43 on the end sleeve 11 of the hose and are electrically connected by means of the screws 44, 44, 44 to the leads 13, 13, 13 which have extended the length of the dusting tool hose to a point adjacent the end thereof at which point they have emerged. As at the opposite end of the hose an encircling protective sleeve 16 surrounds the contacts. The presence of the ring contacts makes possible the rotation of the nozzle unit relative to the hose.

The operation and use of the aforedescribed embodiment of the present invention is quite simple. It being desired to use a dusting tool with the cleaner proper the conduit 10 is attached to the eye of the fan chamber in the position shown in Figure 12, the electrical contacts 17 having first been connected to the cleaner contacts 18. The dusting tool hose 2 is then attached to the conduit 10 and each conductor 13 is immediately connected, thru the contacts 14, 17, and 18 to the source of electrical energy, as aforedescribed. At the opposite end of the dusting tool hose the nozzle-actuating electrical vibrator is connected to the source of energy through throwing the three-position switch 38 into one of its positions. As is clearly seen by reference to Figures 3 and 5 of the drawings it is possible by means of switch 38 to close the circuit of the cleaner motor leaving the vibrator out of the circuit and thereby providing suction only at the dusting tool nozzle; it is also possible to close the circuit of the vibrator at the time the cleaner motor is in operation; or, if the operator so desires, the switch may be positioned to open the circuits of both the cleaner and of the vibrator. Assuming, however, that it it is desired to obtain maximum cleaning effectiveness at the dusting tool nozzle end, switch 38 would be so positioned that the cleaner motor and the vibrator are both supplied with electricity. The energizing of the vibrator results in the high frequency vibration of the moving parts thereof, and the accompanying actuation of the dusting tool nozzle 1 which is, as aforedescribed, directly connected to the vibrator's field. As the moving nozzle 1 is connected by a resilient tube 24 to the dusting tool hose it is freely movable relative thereto. Furthermore, as the vibrating unit is mounted in rubber in the handle of the nozzle unit, there is but slight vibration transmitted to the hand of the user.

Referring to the disclosure of Figure 2 in particular, a construction is shown which is very similar to that aforedescribed. In this embodiment a transformer 44 is provided and the voltage at the dusting tool nozzle end is lower than line voltage. Figure 4 discloses a schematic diagram of the electrical connection of this embodiment. The cleaner is not controllable by the unshown switch at the end of the dusting tool hose in this embodiment, the switch functioning solely to turn the vibrator on and off.

Referring now to the embodiment of the invention shown in Figures 13 to 23, inclusive, the dusting tool hose is again referred to by the reference character 2. The electrical connections of the conduit to the suction cleaner are substantially identical with that found in the first described embodiment. The construction of the dusting tool nozzle unit, however, is different in some important particulars.

Figure 13:
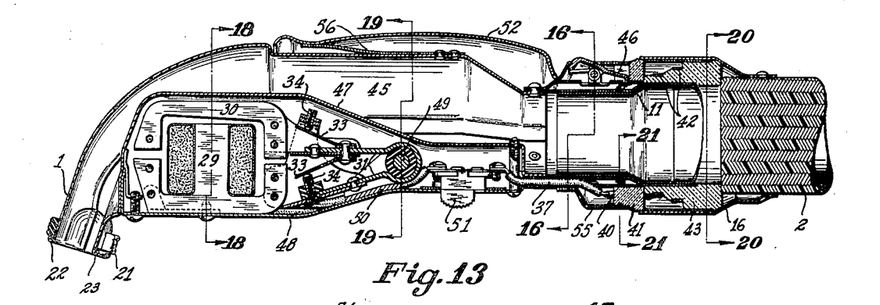
Figure 13 is a vertical section thru a second embodiment of the present invention.
Figure 14:
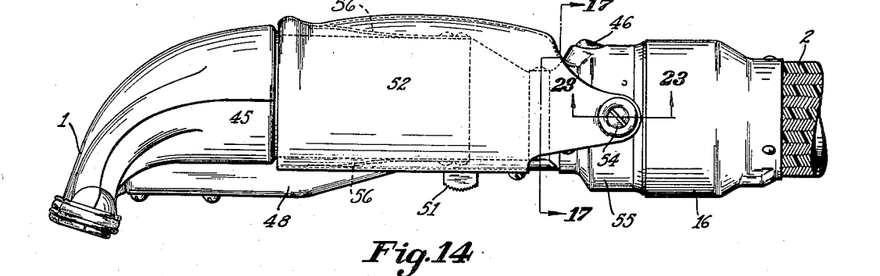
Figure 14 is a side elevation of this second embodiment.
Figure 15:
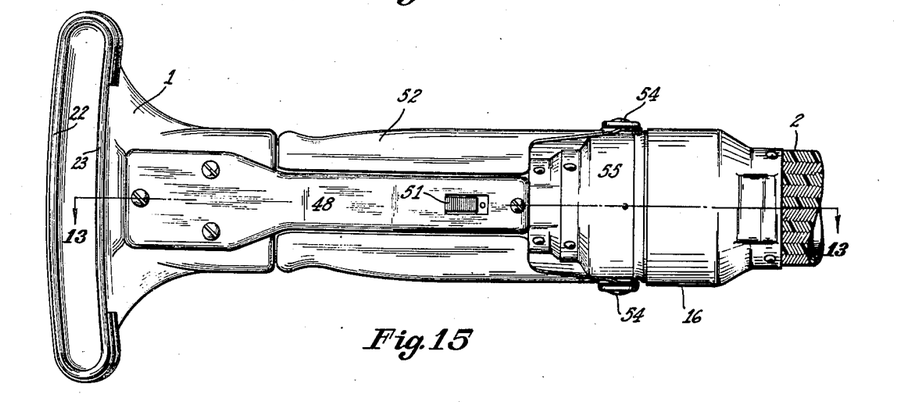
Figure 15 is a bottom view of the embodiment shown in Figures 13 and 14.
Figure 16:
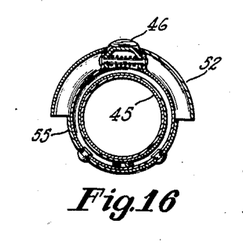
Figure 16 is a section upon the line 16—16 of Figure 13.
Figure 17:
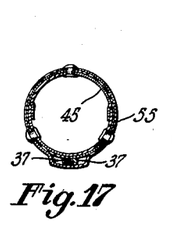
Figure 17 is a section upon the line 17—17 of Figure 14.

In the present embodiment the dusting tool nozzle 1 is formed with a rigidly attached elongated conduit 45, which is detachably secured at its rear end, by means of a spring-pressed detent 46, to the metallic sleeve member 11 at the end of the dusting tool hose 2. Positioned largely within conduit 45 is an elongated sealed housing 47 which is provided with a removable bottom plate 48. Within this housing is mounted an electrical vibrator similar to that described in the first embodiment, with the exception that the springs 31, 31 are not embedded in rubber but are instead carried by a pin 49, which is itself supported by a U-shaped channel member 50 carried by the bottom plate 48.

The leads 37, 37 extend along the exterior of the conduit 45 within an enclosing protecting ring 55 to contacts 40, 40, of a type similar to that disclosed in the first embodiment, which contacts seat against ring contacts 42, 42 carried upon an insulating body 43 at the end of the dusting tool hose as described in connection with the first embodiment.

Figures 18, 19, 20, 21, 22, 23:
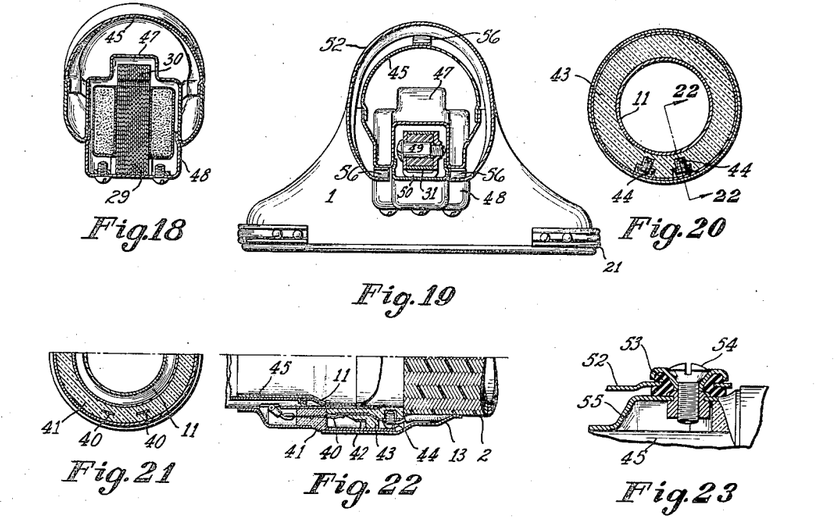
Figure 18 is a section upon the line 18—18 of Figure 13.
Figure 19 is a section upon the line 19—19 of Figure 13.
Figure 20 is a section upon the line 20—20 of Figure 13.
Figure 21 is a section upon the line 21—21 of Figure 13.
Figure 22 is a partial section showing one of the electrical connections between the dusting tool nozzle unit and the dusting tool hose, being a section upon the line 22—22 of Figure 20.
Figure 23 is a section upon the line 23—23 of Figure 14, and shows the cushion mounting of the nozzle unit handle.
Figure 24:
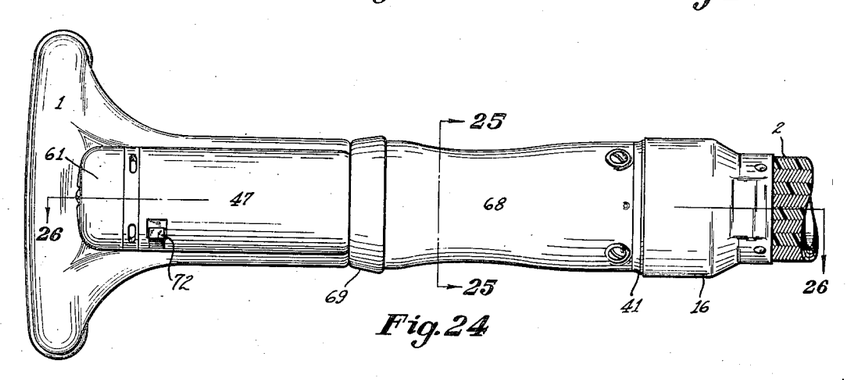
Figure 24 is a top view of a third modification of the present invention.
Figure 25:
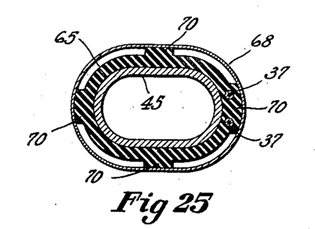
Figure 25 is a section upon the line 25—25 of Figure 24.

In this second embodiment of the invention it will be noted that the vibrating dusting tool nozzle is not connected to the hose proper thru a resilient conduit but is instead directly connected thereto. The vibrating nozzle is directly connected to the vibrating field 29 of the vibrator, the latter being rigidly secured to the bottom plate 48 of housing 47, instead of being connected to the nozzle by means of an arm as in the first embodiment. In order to cushion the vibration transmitted to the hand of the operator a handle 52 is provided which is spaced from and substantially encloses the rear portion of the conduit 45 of the dusting tool nozzle. The handle is pivotally mounted relative to the conduit on diametrically spaced pins 54, 54 which extend into ring 55 on an axis perpendicular to the direction of movement of the vibrating elements, rubber cushion washers 53, 53 seating the handle on the pins. The relationship between the enclosing handle 52 and the vibrating nozzle is such that the movement of the nozzle is essentially independent of the handle which pivots about its supporting pins 54, 54 as the nozzle is vibrated, there being spring levers 56, 56 provided between the interior of the handle and the upper and lower surfaces of the nozzle conduit to prevent actual contact. The present embodiment in operation is quite similar to that aforedescribed.

Referring now to Figures 24 to 35 inclusive, a third modification of the present invention is disclosed. In this modification the dusting tool hose and its connection to the cleaner proper are constructed in the manner described in connection with the first embodiment. The dusting tool nozzle 1 is again formed with an elongated rearwardly extending air conduit 45 as in the second embodiment with the difference, however, that the housing 47 for the nozzle-actuating means is provided in the top of the conduit rather than in the bottom. Housing 47 in this embodiment comprises an integral, substantially cylindrical casing which houses a rotary motor comprising a stationary field 57, rigidly carried by the housing 47, and an armature 58 which is rotatably mounted in bearings 59, 59. The front bearing 59 is carried by a supporting plate 60 which is held against the open end of the casing 47 by the removable end cap 61, which is itself held in place by elongated bolts 62, 62 which run the length of the housing, through the motor field, and into the end wall of the casing. Current is conveyed to the rotating armature through its commutator 63 which is contacted by brushes 64, 64 carried by the motor casing.

Figure 26:
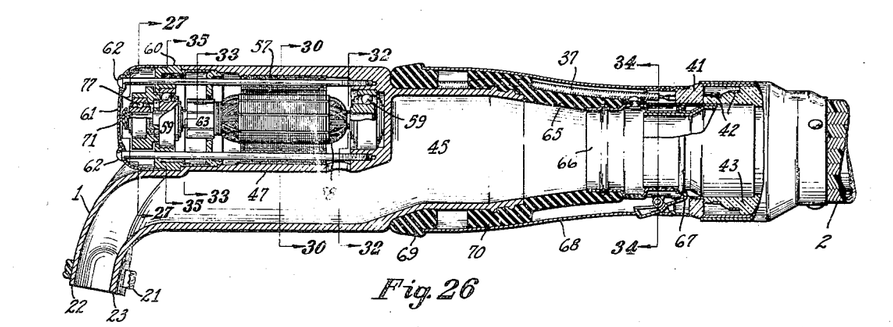
Figure 26 is a vertical section upon the line 26—26 of Figure 24.
Figure 27:
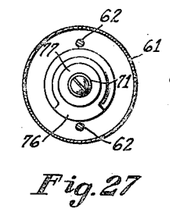
Figure 27 is a section upon the line 27—27 of Figure 26; showing the unbalanced eccentric mass.
Figure 28:
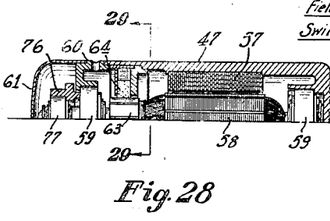
Figure 28 is a section upon the line 28—28 of Figure 33 and shows a partial horizontal cross section through the motor.
Figure 29:
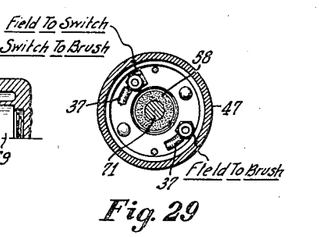
Figure 29 is a section upon the line 29—29 of Figure 28.
Figure 30:
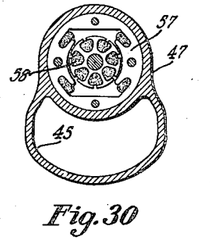
Figure 30 is a section upon the line 30—30 of Figure 26.
Figure 31:
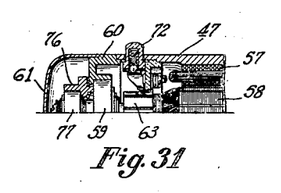
Figure 31 is a partial section through the dusting tool unit motor showing the electrical switch therefor, being taken upon the line 31—31 of Figure 33.
Figure 32:
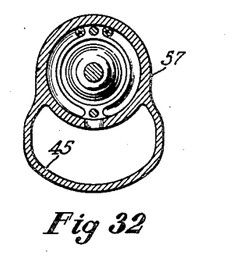
Figure 32 is a section upon the line 32—32 of Figure 26.

The dusting tool nozzle is flexibly mounted relative to the dusting tool hose by means of a resilient tubular member 65 which performs a function similar to that performed by member 24 in the first embodiment. The end of tube 65 spaced from the nozzle proper carries a metallic sleeve member 66 which is provided with the usual spring-pressed detent 67 which functions to secure the nozzle unit to the end of the hose. The current-carrying conductors 37, 37 of the unit make electrical contact with the conductors carried by the conduit 2 in the manner described in connection with the first embodiment.

Surrounding the rear end of the conduit 45 and enclosing both the resilient tubular member 65 and the sleeve 66 is a hollow cylindrical handle 68. Handle 68 is spaced from the parts mentioned by an encircling rubber ring 69 at its forward end, by enlarged portions 70, 70 upon the tube 65 near its middle, and by seats upon the encircling contact-insulating body 41 at its rear end.

To effect the vibration of the nozzle, and more particularly of the lips 22 and 23 thereof, an eccentric mass 76 is rotatably mounted upon a bearing 77 at the forward end of the motor shaft 71. Eccentric 76 is provided with rearward extensions which extend between the balls of front bearing 59, as is clearly shown in Figure 35, so that upon the rotation of the armature, and the consequent rotation of the balls, the eccentric will also rotate upon its bearing, its unbalanced mass effecting a vibration of the resiliently mounted dusting tool nozzle at a frequency less than the speed of rotation of the motor. The frequency of vibration is determined by the speed of rotation of eccentric mass 76 which is rotated by the balls of bearing 59. Those balls move around the axis with a speed less than the speed of shaft rotation, their speed of movement being determined by the circumferences of their inner and outer races.

Figure 33:
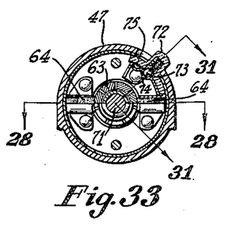
Figure 33 is a section upon the line 33—33 of Figure 26.
Figure 34:
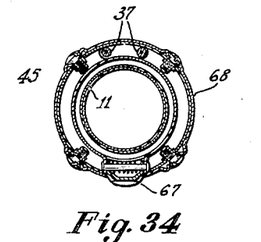
Figure 34 is a section upon the line 34—34 of Figure 26.
Figure 35:
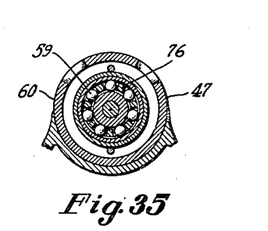
Figure 35 is a section upon the line 35—35 of Figure 26, and shows the front bearing mounting of the motor.

To provide means to open and close the electric circuit through the rotary motor a manually slidable switch 72 is provided which extends outwardly through the motor casing 47, as is clearly shown in Figure 33. The switch is shown in Figure 33 in the closed position, the contact ball 73 bridging the gap 74 to complete the electric circuit. Upon the switch moving counter-clockwise to the seat indicated by the reference character 75 the gap 74 will be left open and the circuit through the vibrator motor will be open.

In the operation of this last described embodiment of the invention there are no reciprocating parts, the vibration and agitation being accomplished by the high speed rotation of the eccentric mass 76. The functional operation of this embodiment is, however, the equivalent of that aforedescribed with the exception that the surface-contacting lips 22 and 23 will be moved in a plurality of directions whereas the lips of the aforementioned embodiments are provided with a linear reciprocating movement.

I claim:

1. A dusting tool nozzle unit including a nozzle through which cleaning air is adapted to pass, a hose, a closely adjacent handle resiliently connected to said nozzle and rigidly connected to said hose, and an electric vibrator operatively connected to said nozzle.

2. A dusting tool nozzle unit including a surface-contacting nozzle member, a conduit adapted to be secured to a hose, means resiliently connecting said nozzle member to said conduit, a handle on said conduit, and an electric vibrator carried by said handle and connected to said nozzle member.

3. A dusting tool nozzle unit including a nozzle mouth member, a connector adapted to be secured to a hose, means resiliently connecting said nozzle mouth member to said connector, a vibrator unit connected to said nozzle mouth member, including a light movable armature and a relatively heavy field, said nozzle being rigidly connected to said field and said armature being mounted for free vibration.

4. A dusting tool nozzle unit including a nozzle mouth member, a connector adapted to be secured to an air-conducting hose, means movably connecting said nozzle mouth member and said connector, a vibrator unit carried by said connector connected to and adapted to vibrate the surface-contacting portions of said nozzle mouth member, and electrical contacts carried by said connector connected to said vibrator, said contacts adapted to make contact with contacts carried by said air-conducting hose.

5. In a dusting tool unit, a nozzle, electrical agitator-actuating means for said nozzle, a connector for said nozzle including electrical contacts connected to said means, means resiliently connecting said nozzle to said connector, a hose removably secured to said connector, electrical conductors along said hose, contacts at the end of said hose contacting the contacts carried by said connector, characterized by the fact that said hose is rotatable relative to said connector and that said contacts are in contact in all relative positions of said hose and connector.

6. A dusting tool nozzle unit including a surface-contacting air-conducting nozzle, means to connect said nozzle to an air-conducting hose, an electric vibrator connected to and adapted to vibrate said nozzle, and a handle pivotally mounted relative to said surface-contacting nozzle for movement about a single axis perpendicular to the direction of nozzle vibration and spaced from said nozzle.

7. A dusting tool unit including a nozzle, a hose resiliently connected to said nozzle, a rotary motor carried by said nozzle, an eccentric mass driven by said motor to vibrate said nozzle, electrical connections for said motor including conductors extending along said hose, and handle means for said nozzle resiliently connected thereto and non-resiliently connected relative to said hose.

8. In a dusting tool nozzle unit for use with an electric suction cleaner including suction-creating means and an elongated dusting tool hose connected at one end to said cleaner and interiorly connected to said suction-creating means, and means to convey power to the end of said hose; a nozzle unit at the opposite end of said hose including surface-contacting portions and a handle, means mounting the surface-contacting portions of the nozzle for movement relative to the handle and the handle being fixed relative to said hose, and means to vibrate the surface-contacting portions of said nozzle.

9. In a dusting tool nozzle unit for use with an electric suction cleaner including suction-creating means, an elongated dusting tool hose connected at one end to said cleaner and interiorly connected to said suction-creating means, and electric conductors extending from said cleaner along said hose; a dusting tool nozzle unit at the opposite end of said hose including surface-contacting lips movable relative to a stationary part of said unit, said stationary part being connected between said hose and said lips, an electric vibrator at the nozzle-end of said hose and operatively connected to said nozzle to vibrate the movable surface-contacting lips thereof, and an electric switch in the circuit of said vibrator carried by said stationary part.

10. In a dusting tool nozzle unit for use with a suction cleaner embodying suction-creating means, a hose connected thereto, and current conductors conveying power to the end of said hose; a suction nozzle mouth movably connected to said hose, a handle firmly connected to the end of said hose and movably connected to said nozzle mouth for limited relative movement, and vibrating means actuating said nozzle mouth with a vibratory motion independently of said hose or supporting handle, said vibrating means being connected to said current conductors.

11. In a dusting tool nozzle unit for use with a suction cleaner embodying suction-creating means, a hose connected thereto, and current conductors conveying power to the end of said hose; a surface-contacting member at the mouth of said unit, flexible means connecting said member to said hose, a handle rigidly connected to said hose, an electric vibrator carried by said handle, and means connecting said surface-contacting member to a movable element of said vibrator.

12. The construction recited by claim 11 characterized in that the vibrator is floatingly mounted in said handle, both the armature and the field thereof being mounted for free movement relative to said handle.

13. The construction recited in claim 11 characterized in that the relatively heavy vibrator field is connected to said surface-contacting member and the relatively light armature moves freely, both the armature and the field being spring mounted on said handle.

14. In a dusting tool nozzle unit for use with a suction cleaner embodying suction-creating means, a hose connected thereto, and current conductors conveying power to the end of said hose; a nozzle unit including a nozzle member including a surface-contacting mouth, and a vibrator mounted in said unit including a vibrating heavy element and a vibrating light element, the said heavy element being connected to said member and the light element being freely movable to exert a counterbalancing effect to the effect of said heavy element, and a handle to support said nozzle member resiliently connected thereto to eliminate transference of vibration therebetween.

15. In a dusting tool nozzle unit for use with a suction cleaner embodying suction-creating means, a hose connected thereto, and current conductors conveying power to the end of said hose; a tubular connector adapted to seat on the end of said hose and including electrical contacts adapted to make electrical contact with said conductors, a nozzle mouth member, a flexible conduit connecting said member to said connector, a handle carried by said connector, and an electrical vibrator connected to said member to produce vibration therein and connected to said electrical contacts.

16. A dusting tool nozzle unit including a nozzle through which air is adapted to pass, a hose, a closely adjacent handle resiliently connected to said nozzle and rigidly connected to said hose, and electric vibrating means operatively connected to said nozzle comprising a rotary member, a supporting ball bearing for said member, and an eccentric mass movable about the axis of rotation of said member at a speed less than the speed of rotation of said member, said mass being connected to and moved by the balls of said bearing.

17. A dusting tool nozzle unit including a nozzle through which air is adapted to pass, a hose, a closely adjacent handle resiliently connected to said nozzle and rigidly connected to said hose, and electric vibrating means operatively connected to said nozzle comprising a rotary member, a ball bearing including an inner race movable with said member, a fixed outer race radially spaced from said inner race, and balls between said races, and an unbalanced mass connected to said balls and moved thereby as said balls roll around said outer race upon the rotation of said rotary member.

18. A dusting tool nozzle unit including a nozzle through which cleaning air is adapted to pass, a hose, a closely adjacent handle resiliently connected to said nozzle, said handle being rotatable relative to said hose, and an electric vibrator operatively connected to said nozzle.

19. A dusting tool nozzle unit including a nozzle through which cleaning air is adapted to pass, a hose, a handle connected to said hose and adapted to support same, means resiliently connecting said nozzle to said handle, and an electric vibrator operatively connected to said nozzle.

20. In a dusting tool unit, a nozzle, electrical agitator-actuating means for said nozzle, a connector for said nozzle including electrical contacts connected to said means, means connecting said nozzle to said connector, a supporting handle connected to said connector, resilient means between said handle and said nozzle to eliminate the transference of vibrations, a hose removably secured to said connector, electrical conductors along said hose, contacts at the end of said hose contacting the contacts carried by said connector, characterized by the fact that said hose is rotatable relative to said connector and that said contacts are in contact in all relative positions of said hose and connector.

21. A dusting tool nozzle unit including a nozzle, surface-contacting agitating means at the mouth of said nozzle, connecting means to connect said nozzle to an air-conducting hose, an electric vibrator connected to and adapted to vibrate said agitating means, a supporting handle connected to said connecting means and by which said unit and an attached hose can be supported, and vibration-absorbing means between said agitating means and said handle to prevent the transference of vibrations to said handle.

22. A dusting tool nozzle unit including a nozzle, surface-contacting agitating means at the mouth of said nozzle, connecting means to connect said nozzle to an air-conducting hose, an electric vibrator connected to and adapted to vibrate said agitating means, a supporting handle connected to said connecting means and by which said unit and an attached hose can be supported, and vibration-absorbing means between said agitating means and said handle and between said vibrator and said handle to insulate said handle from the vibrations in those parts.

DONALD G. SMELLIE.